United States Patent
Blahut

(10) Patent No.: US 6,778,550 B1
(45) Date of Patent: Aug. 17, 2004

(54) METHOD AND APPARATUS FOR TDM/TDMA COMMUNICATIONS

(75) Inventor: Donald Edgar Blahut, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,947

(22) Filed: Feb. 29, 2000

(51) Int. Cl.[7] ................................................. H04J 3/00
(52) U.S. Cl. ...................... 370/443; 370/449; 370/458
(58) Field of Search ................................. 370/329, 337, 370/341, 347, 442, 458, 468, 473, 477, 478, 485, 486, 487, 489, 496, 463, 461, 443, 449; 359/123, 135

(56) References Cited

U.S. PATENT DOCUMENTS

| | | | | |
|---|---|---|---|---|
| 5,481,542 A | * | 1/1996 | Logston et al. | 370/94.2 |
| 5,570,355 A | * | 10/1996 | Dail et al. | 370/60.1 |
| 5,926,476 A | * | 7/1999 | Ghaibeh | 370/395 |
| 5,926,478 A | * | 7/1999 | Ghaibeh et al. | 370/395 |
| 5,953,344 A | * | 9/1999 | Dail et al. | 370/443 |
| 5,956,338 A | * | 9/1999 | Ghaibeh | 370/395 |
| 6,023,467 A | * | 2/2000 | Abdelhamid et al. | 370/395 |
| 6,055,242 A | * | 4/2000 | Doshi et al. | 370/458 |
| 6,370,153 B1 | * | 4/2002 | Eng | 370/438 |
| 6,563,829 B1 | * | 5/2003 | Lyles et al. | 370/395.21 |

FOREIGN PATENT DOCUMENTS

WO    WO 00/01127    1/2000

OTHER PUBLICATIONS

J.E. Dail et al., *IEEE Communications Magazine* "Adaptive Digital Access Protocol: A MAC Protocol for Multiservice Broadband Access Networks", vol. 34, No. 3, Mar. 1996, pp. 104–112.

* cited by examiner

*Primary Examiner*—Chau Nguyen
*Assistant Examiner*—Duc Duong
(74) *Attorney, Agent, or Firm*—Stephen M. Gurey

(57) ABSTRACT

In a power splitting passive optical network, TDM/TDMA communication is employed for downstream/upstream transmission over a fiber. A framed structure is used for the downstream transmission from an optical line card (OLC) at the network end to a plurality of optical network units (ONUs), which are each connected to end user equipment. A framed structure is also employed for upstream burst transmission from the plural ONUs to the OLC. In the upstream direction each ONU transmits at most one burst per frame that includes a header and a payload containing a variable number of bytes that is adjustable on a continuum. The length of each payload in a burst transmitted upstream by an ONU is determined as a function of the bandwidth requirements of the end user equipment connected to that ONU as well as the bandwidth requirements of the end user equipment at the other ONUs.

24 Claims, 4 Drawing Sheets

METHOD AND APPARATUS FOR TDM/TDMA COMMUNICATIONS

TECHNICAL FIELD

This invention relates to Time Division Multiplexing/Time Division Multiple Access (TDM/TDMA) communications.

BACKGROUND OF THE INVENTION

In systems employing TDM/TDMA for the transmission of signals, TDM is typically used to transmit signals downstream from a network end to a plurality of end-user terminals at a home or business over a single channel. At the home or business end, a receiving terminal receives all downstream transmissions that are directed both to it and the other end-user terminals. However, in each received frame of data bytes, only those bytes that are properly intended for a particular receiving terminal are delivered to that terminal for processing. Typically, this can be done by assigning different time-slots in each frame to specific receiving terminals. Each receiving terminal thus only "looks" in its assigned time-slot for the bytes directed to it. Alternatively, the downstream signal, if originating, for example, from a broadband asynchronous transfer mode (ATM) network, may consist of a sequence of ATM cells which each include header information indicating an address of the destination(s) to which the cell is directed. A receiver terminal then only "picks out" the ATM cells that are addressed to it or are broadcast to many, and discards the other ATM cells addressed elsewhere.

In the upstream direction, TDMA transmission is used for transmitting the outputs of multiple end-user terminals back to the network end. One way this is implemented is to allow an end-user terminal to transmit back to the network end only during a specific time-slot each frame. At the network end, therefore, the bytes received from the multiple end-user transmitting terminals are demultiplexed into separate plural data streams in accordance with the time-slots each frame during which they are received.

Whereas the one-to-many aspect of TDM downstream transmission on a single channel is implemented in a relatively straight-forward manner at both the network end and the end-user terminal end, upstream transmission from a plurality of end user terminals to a single network end presents several technical difficulties with respect to the management of the available upstream bandwidth. This is particularly true in digital broadband access networks that employ optical fiber-to-the-home (FTTH), utilizing a power splitting passive optical network (PSPON) topology. As presently configured, each PSPON fiber can support up to 32 homes or businesses. In such a system, bidirectional communications over a single fiber is achieved using coarse wavelength division multiplexing (CWDM), in which one wavelength, 1550 nm, is used for downstream communications to all home/business end user terminals that are connected to that fiber. Another wavelength, 1310 nm, is then used for transmission to the network end of upstream data from all those connected homes/business terminals. That data, in both directions, can include video, data (e.g., Internet-type data), and digitized voice. In such systems, the fiber is terminated at the home/business by an Optical Network Unit (ONU), and at the network end by an Optical Line Card (OLC).

In such systems, ATM in a frame structure is employed for downstream transmission while ATM transmitted in bursts is used for upstream transmission. Prior art PSPON based systems use a framed structure, in the downstream direction, that consists of 2968 bytes at a bit rate of 155.52 mbits/sec. These 2968 bytes in each downstream frame, represent 56 ATM cells/frame, each cell consisting of a 5-byte header and a payload of 48 bytes. Addressing information is included within that 5-byte header, which enables each of the up to 32 end user ONUs to select for reception by its connected terminals only those ATM cells that are broadcast or specifically addressed to it. In the upstream direction, the ONUs transmitting to the OLC consecutively transmit bursts, each burst containing a single ATM cell. Assuming an additional 3-byte burst header, each burst is thus 56 bytes long. Each 2968 byte frame, therefore, contains 53 bursts, each being 56 bytes. If each ONU transmits one burst per frame, approximately 2.777 mbits/sec of user ATM upstream bandwidth is available to each end user terminal. Disadvantageously, a finer bandwidth granularity (e.g., less than 2.777 mbits/sec) per end user terminal requires assigning p bursts every m frames, requiring a complicated upstream bandwidth management procedure. Further, if an end user terminal requires a higher upstream bandwidth (e.g., higher than 2.777 mbits/sec), the ONU must manage multiple bursts per frame from such a terminal. Digital voice communications in prior art system has further inefficiencies. Specifically, since the bandwidth requirement for a digital voice channel is only 64 kbits/sec (equivalent to one byte per frame), 47 of the 48 payload bytes in each ATM cell containing digitized voice in each upstream burst remain unused (assuming one burst every 125 $\mu$sec). If, alternatively, 48 voice samples are accumulated over a 6 msec period before being transmitted, echo cancellation will likely need to be implemented due to the delay imposed on the transmitted voice samples. Furthermore, the 8000 samples/sec associated with digital voice circuits cannot be simply generated from the non-8000 frames/sec frame rate.

A need therefore exists to better control the bandwidth allocation to end user terminals of all types, and especially as applied to digital transmission of voice signals.

SUMMARY OF THE INVENTION

In accordance with the present invention, efficient bandwidth allocation is achieved by using variable length bursts for upstream transmission. Rather than setting the length of each upstream burst at a fixed length, the length of each burst is determined in accordance with the actual bandwidth requirements of the transmitting end user terminal. In particular, and depending upon the overall bandwidth requirements of all the end user terminals transmitting over the upstream channel, the number of payload bytes per burst can vary between zero and the total number of payload bytes allocated per frame. The latter would occur if only one end user terminal is connected to the channel for upstream communication. In the more likely scenario of multiple end user terminals communicating over the channel, the total number of bytes per upstream frame are divided among all the end user transmitting terminals in accordance with their current bandwidth requirements and the overall bandwidth capacity of the channel. Each end user transmitting terminal then transmits one and only one burst each frame. That burst contains all the digital information that the end user is transmitting upstream to the network end including, for example, video, data, and digital voice. Advantageously, a high degree of granularity in allocating bandwidth can be achieved since the burst length can be adjusted in one byte increments.

For the specific embodiment of the PSPON topology in which frames are conveniently transmitted at 8000 frames per second and in which the upstream frame comprises 2430 bytes, bandwidth can be assigned in one byte×8000/sec increments or equivalently, 64 kbit/sec increments. Advantageously, included within the payload of each upstream burst transmitted by the ONU that is connected to one or more end user terminals then being used, is one byte per each active digital voice channel required by that end user. Thus, if there is no current active telephonic conversation, no bytes are used, whereas if one voice channel is active, a single byte in the upstream burst is allocated to and used for digital voice transmission. Additional voice circuits associated with that same ONU are transmitted in additional bytes in the upstream burst. The bandwidth allocated for each such digital voice channel is thus an efficient 64 kbit/sec for the specific example of a frame arrangement noted above.

In order to manage the allocation of upstream bandwidth among the plural end user terminals transmitting upstream information, the terminating terminal associated with each end user, such as the ONU, is assigned the timing and length of its upstream TDMA slot. This is effected through the broadcast of downstream cells containing slot assignment or modification messages to the terminating terminal. The slot assignment messages include information used for assigning a slot of a specified length to a particular end user terminating terminal. Such information thus includes where (i.e., from which byte position) within each upstream frame that the terminating terminal is to transmit, and how many bytes the payload of each burst from that terminal is to be. An assignment message is used to assign an upstream slot to a newly installed end user terminating terminal and to reassign (i.e., confirm) an existing assignment as a fault recovery mechanism. A modification message is used to change the length of an existing slot assignment and/or the number of digital voice channels associated with the terminating terminal to which the message is directed. Such a message, by necessity, is also used to move the location of all assigned slots located after that modified slot in the frame.

DETAILED DESCRIPTION

Figure 1:
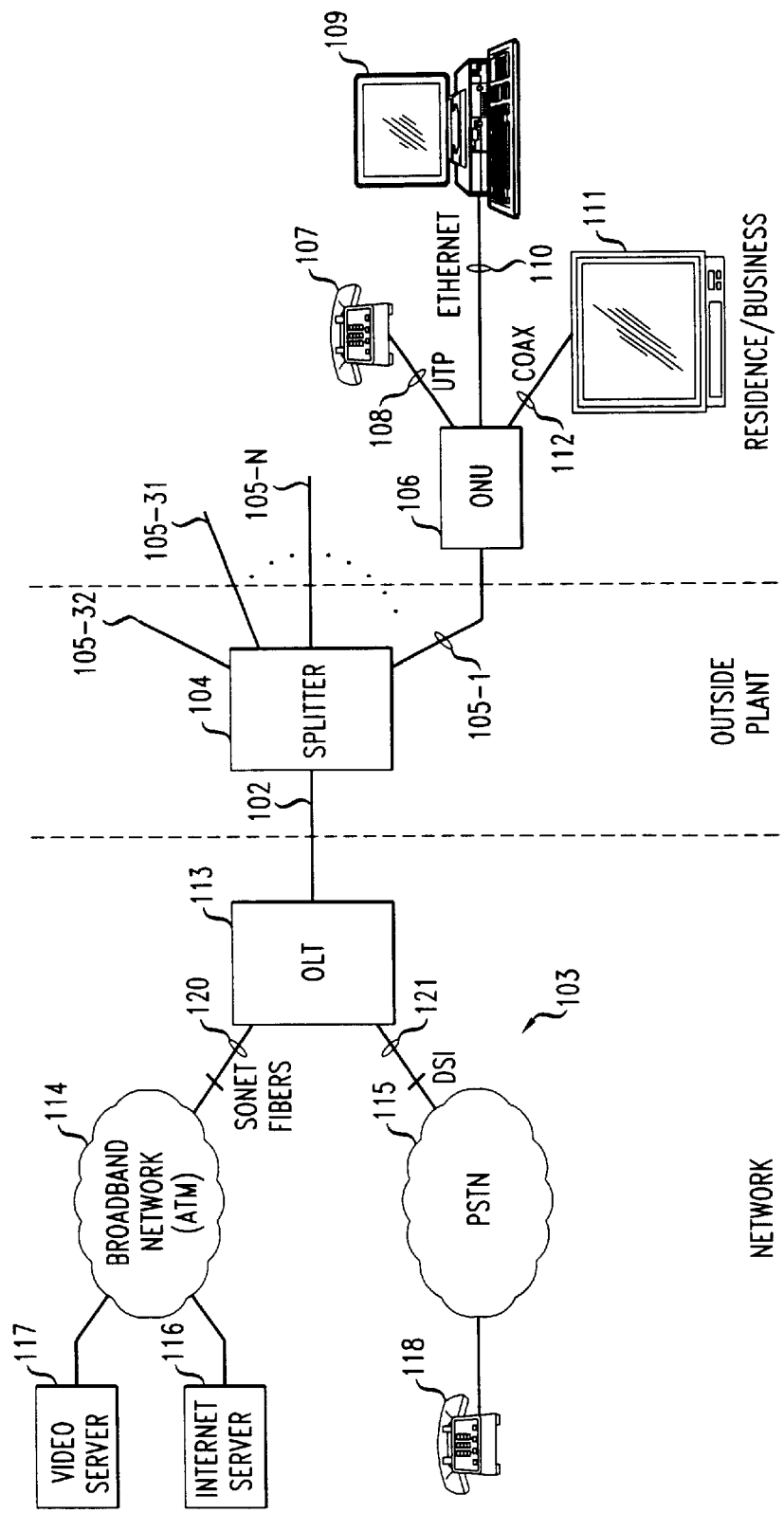
FIG. 1 is a block diagram of a PSPON fiber system incorporating the present invention.

With respect to FIG. 1, a fiber-to-the-home communications system 101 is shown that incorporates TDM/TDMA transmission over a PSPON fiber 102, in accordance with the invention. That fiber 102 interconnects the network end 103 to a passive optical splitter 104. Splitter 104 passively splits the power in the downstream optical signal transmitted from the network end 103 into up to, for this embodiment, 32 optical fibers, 105-1–105-32. It should be obvious that as technology develops lower-loss optical fibers, and/or if spans are limited to shorter lengths, the power transmitted in an optical fiber could be split into more than 32 fibers to server a greater number of end users. Each such optical fiber 105-1, for example as shown, is connected to a terminal known as an Optical Network Unit (ONU) 106 at a business or residence location. At the illustrated residence endpoint, three examples of end user terminal equipment are shown connected to ONU 106. These include a telephone station set 107 connected over a conventional unshielded twisted pair (UTP) of wires 108 to a telephone interface (not shown) in ONU 106; a personal computer (PC) 109 connected to ONU 106 over a data link 110, such as an Ethernet, to an Ethernet interface in ONU 106: and a standard television 111 connected to ONU 106 via a standard coaxial cable 112. In order to drive a standard television, ONU 106 includes (not shown) an MPEG decoder and an NTSC encoder, for generating a TV compatible signal from a received digital MPEG signal being transmitted downstream from the network end 103.

At the network end 103, fiber 102 terminates in a Optical Line Terminal (OLT) 113 which also terminates a plurality of other PSPON fibers. Each such other PSPON fiber is connected through another power splitter to what may be up to 32 other residences/businesses. Included within OLT 113 are a plurality of Optical Line Cards (OLCs) (not shown in FIG. 1), which each individually terminate a single PSPON fiber. OLT 113 is connected to two networks: a broadband network 114, such as an ATM network; and a Public Switched Telephone Network (PSTN) 115. The broadband network 114, which in this illustrative embodiment is an ATM network, is typically connected to OLT 113 via a plurality of SONET fibers, collectively designated as 120. Servers connected to the ATM network 114, such as an Internet server 116 and a video server 117, deliver service, in ATM format, onto network 114. Both IP data and MPEG video services are currently supported by existing ATM standards. Accordingly, no further description of IP data or MPEG video over ATM is given herein. OLT 113 is connected to PSTN network 115 via, for example, a plurality of DS1 circuits, collectively 121, that each deliver 24 DS0 voice channels. Rather than a virtual connection, PSTN network 115 establishes a conventional circuit-switched telephone connection to end-users at telephone station sets, such as 118, connected to the network.

In the embodiment of the present invention, downstream transmission between the network end 103 over PSPON fiber 102 to the up to 32 fibers 105-1–105-32, which are each connected to an ONU, is in a TDM fixed frame format that consists of a total 2430 bytes transmitted at an 8000 frames/sec rate. Downstream optical transmission over the fiber 102 is at a 1550 nm wavelength. Each frame includes a 3 byte framing pattern, leaving a 2427 byte payload. For purposes of the present embodiment, all downstream payload data is formatted as ATM cells. Each cell includes 48 bytes of payload with a 5 byte ATM header. Since each ATM cell is 53 bytes long and the frame payload is not integrally divisible by 53, each frame boundary is typically spanned by an ATM cell. Each downstream ATM cell contains what may be either video MPEG data, IP data, or other data, and a destination address (contained within the header) for that cell. That cell may be directed to more than one end user terminal. For example, a cell originating from a video server may be broadcast to all or plural selected end users' television sets that are connected to different ONUs via fibers 105-1–105-32. That same cell may also be transmitted over the other PSPON fibers to different splitters and ONUs connected thereto. On the other hand, a cell containing IP data may be addressed, for example, to only the single end user's PC 109 connected to ONU 106. Digitized voice data from the station sets connected to PSTN 115 are broadcast on fiber 102 to each ONU connected to fibers 105-1–105-32. Specifically, two DS1 frames, each consisting of 24 digitized DS0 voice channels are combined in a 48 byte channel payload for a dedicated ATM virtual circuit (VC). By transmitting downstream one such ATM cell per frame, forty-eight 64 kbit/sec downstream channels are provided corresponding to voice channels. Each ONU then extracts from that ATM cell in each frame the byte that is assigned to its active voice channel. If more, N, active telephone station sets are connected to an ONU, then N such bytes are extracted from that cell each frame, each byte being associated with one of the voice channels.

Figure 2:
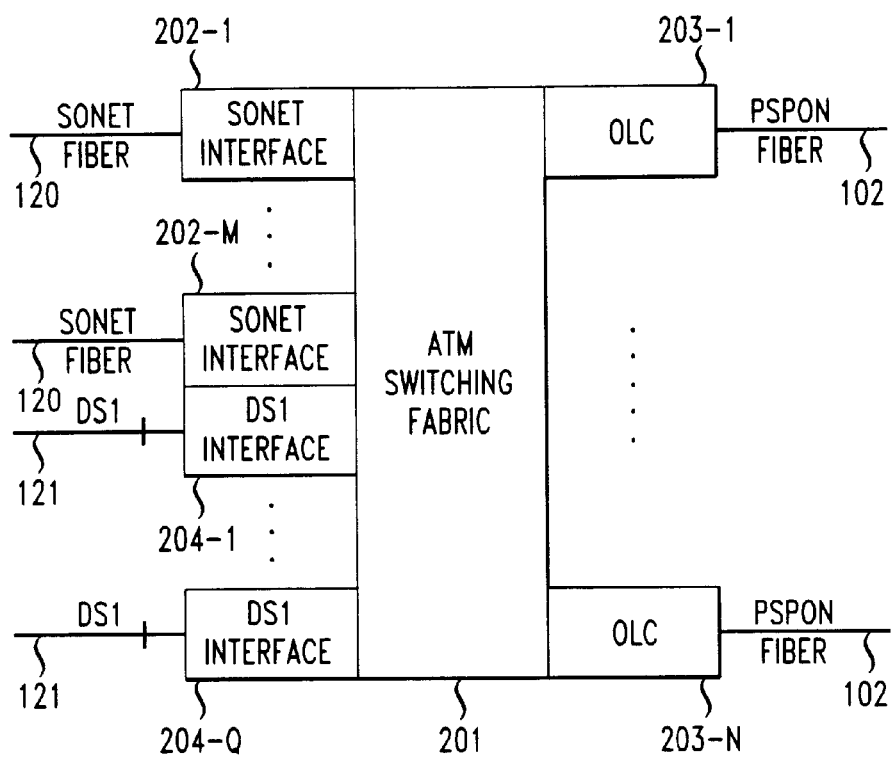
FIG. 2 is a block diagram of the Optical Line Terminal (OLT) at the network end in FIG. 1 that interconnects an ATM network and a Public Switched Telephone Network with the PSPON fibers.

FIG. 2 illustrates a block diagram of OLT 113. It includes an ATM switching fabric 201 to which is connected a plurality of SONET interfaces 202-1–202-M. SONET fibers 120, connected to ATM network 114 in FIG. 1, are connected to SONET interfaces 202. Each ATM cell received from ATM network 114 via one of the a SONET fibers 120 is routed through the ATM switching fabric 201 to one or more appropriate Optical Line Cards (OLCs) 203-1–203-N in accordance with the cell's ATM address. Each such OLC interfaces with a PSPON fiber, such as fiber 102 in FIG. 1. As previously noted, each PSPON fiber interfaces with a splitter in the outside plant, which passively splits the downstream signal into up to 32 equal optical signals. Thus, each OLC within OLT 113 is connected to a separate PSPON fiber 102, which in turn supports service provisioning to up to 32 different residences/businesses. Also connected to the input of switching fabric 201 are a plurality of DS1 interfaces 204-1–204Q, which each support 48 DS0 digital voice circuits from a pair of DS1 inputs.

In the downstream direction, ATM switching fabric 201 receives an ATM cell from the ATM network (originating, for example, from a video server or Internet server) and routes it, in accordance with its address, to the proper OLC 203-1–203-M associated with its intended destination. That cell is then transmitted in the payload of a frame (or in two frames if that cell spans two frames) to the corresponding splitter at the outside plant location. That cell is then delivered to each connected ONU. Only if the cell is addressed to ONU 106, however, is it accepted by ONU 106 and delivered to the appropriate connected end user terminal, such as the PC 109 or TV 111, as shown in FIG. 1. With respect to the 48 DS0 voice circuits that are inputted to each DS1 interface 204, the 48 DS0 voice circuits are formatted as a single ATM cell and routed by the ATM switching fabric 201 to the appropriate OLC for broadcast on that fiber. As noted, each ONU that is connected to that fiber extracts only the byte or bytes from that cell that is (are) associated with its voice channel(s).

In the upstream direction, in accordance with the invention, variable length bursts are transmitted by each ONU. Each ONU that is connected through the same splitter to a common PSPON fiber transmits one burst per 2430 byte-length frame back to the network end at a wavelength of 1310 nm. Each upstream burst contains a 3 byte burst header and a payload consisting of between 0 and 2427 bytes. As will be discussed, the 2430 bytes per upstream frame are divided among the actual number of plural ONUs that are connected and are operating. Each burst from each connected ONU contains one byte per active voice channel that is concatenated with digital video and IP data signals, each in ATM format, outputted by, for example, a video source such as a camera, and a PC, respectively. Since the payload of each burst transmitted by each ONU may not have a length that incorporates both the number of bytes needed for its active voice channels plus a full or an integral number of ATM cells, the bytes associated with such ATM cells are transmitted by the ONU each burst to the OLC at the network end, where they are accumulated to form ATM cells. At the OLC, each ATM cell is formed and routed over a SONET fiber 120 to the ATM network 114 for transmission to its intended destination indicated in its header address such as, for example, the video server 117 or Internet server 116. Within the OLC, the digital voice channels from all the ONUs assigned the corresponding downstream VC are combined yielding two upstream DS1 frames which are outputted through an appropriate DS1 interface 204 to the circuit-switched PSTN network 115 for individual transmission of each channel to a telephone station set.

In the downstream direction, the OLC sequentially transmits 53-byte ATM cells within each frame, which are broadcast to each ONU. Each ONU determines whether a received cell is directed to it or not. Since each received ATM cell originates from the same OLC, each cell is timed to begin transmission as soon as the previous cell has been transmitted. In the upstream direction, however, each burst originates from a different ONU. Transmission of each burst from each ONU is precisely timed so that it reaches the splitter just as another ONU has finishing transmitting its burst. Since the loop transmission delays of the fibers 105-1–105-32 connecting the ONU 106 and splitter 104 differ in accordance with the length of each fiber loop, a ranging procedure is implemented as each ONU in the system is installed to compensate for loop transmission delay thereby eliminating the need for a time interval between bursts. Specifically, a ranging procedure is executed as each ONU is installed that results in a common loop delay, comprising the loop transmission delay plus a calculated and assigned "ranging delay." The "ranging delays" are calculated to also conveniently synchronize the upstream frames with downstream frames. In the specific embodiment described herein, that loop delay is set at two frames, or 250 $\mu$sec (based on 8000 frames/sec). Therefore, at the OLC, the received upstream communications consists of a continuous sequence of upstream frames, each in response to downstream frame transmitted two frame periods earlier, each of those upstream frames consisting of a sequence of concatenated bursts, one per active ONU. A ranging procedure that can be employed is described in co-pending patent application, Ser. No. 09/356,980 filed Jul. 19, 1999, entitled "Ranging Arrangement and Method for TDMA Communications," which is incorporated herein by reference.

With variable length bursts being transmitted upstream, each ONU transmits only one burst per frame. Therefore, as noted, only one variable length upstream slot having a length between 3 and 2430 bytes is assigned per ONU. Timing for upstream frames is derived from the downstream signal which includes, as noted, three framing bytes per every downstream 2430 byte frame. Once each ONU detects the framing byte pattern in the downstream signal, upstream transmission is synchronized to the downstream signal. As a system "grows", through the addition of ONUs and associated end user terminals, bandwidth allocation is redistributed and slot assignments are modified. Thus, when only a single ONU is connected to a splitter, a slot having a 3-byte header and a 2427-byte payload is assigned to that ONU. As more ONUs are activated, a slot is assigned to each, thereby requiring both a re-allotment of bytes to the already active ONUs. Specifically, within the 2430 byte upstream frame, a slot assignment for each ONU is made indicating at which byte within the 2430 byte frame that ONU's slot is to start and how many bytes that slot should be. As each ONU becomes active, it sends an out-of-band signal, such as a tone, back to the OLC, which in turn initiates a ranging procedure, previously described, to insure an equal loop delay per ONU. As part of that ranging procedure, a ranging delay is determined for that ONU to ensure equal loop delay. That ranging delay is determined by the OLC and transmitted downstream from the OLC to the ONU, together with an assigned identity for that ONU. That ranging delay is then used by that ONU to artificially insert an electronic delay to its upstream burst transmissions so that all ONUs connected to a common splitter have equal transmission delays. Further, each ONU is assigned its upstream TDMA slot through a broadcast downstream of a Physical Layer Operation and Maintenance (PLOAM) cell. Such PLOAM cells can be formatted in many ways and messages to more than one ONU can be combined within a single PLOAM cell. Such PLOAM cells are also used to broadcast downstream to all ONUs whatever changes may need to be made to slot assignments in accordance with a received request from an ONU for more bandwidth, or a received indication that a particular ONU no longer needs all of the bandwidth assigned to it.

In the specific embodiment, each upstream slot management message contains four fields: 1) a 1-byte message type field; 2) a 1-byte ONU identification field for indicating the particular ONU to which the message is associated; 3) a 6-byte message contents field containing the message; and 4) a cyclical redundant code (CRC) field for error correction. The specified sizes of each field are merely illustrative for the embodiment in which 32 ONUs are supported per PON and the 2430 byte maximum size of a burst. Three message types are used for upstream slot management: 1) an assignment message, which is used for the assignment of a slot to a particular ONU; 2) a modification message, which is used for the modification of an already assigned slot; and 3) an idle message, which is used for unused messages of a multi-message PLOAM cell.

An assignment message contains three fields: 1) a 2-byte start_of_slot location, which is the byte offset into each upstream frame identifying the first byte of the assigned slot; 2) a 2-byte burst_payload_size, which is the number of bytes per burst excluding the three overhead bytes; and 3) and a 2-byte ds0_channels, which is the number of leading bytes per upstream burst payload representing DS0 voice channels, one DS0 channel per payload byte. Assignment messages are used to assign an upstream slot to newly installed ONUs. In addition, they are used to confirm an existing assignment as a fault recovery mechanism.

A modification message is used to change the length of an existing upstream slot assignment, and/or the number of DS0 voice channels. These messages also move the location of all assigned slots located after that modified slot in the frame since increasing or decreasing a slot size necessitates changing the starting byte position of each slot that follows as well a possibly the size of one or more slots. The modification message contains three fields: 1) a 2-byte start_of_change location, which is the byte offset into each frame identifying the first byte position to be changed and is typically the start-of-slot location of the slot being changed; 2) a 2-byte change_size, which is a signed quantity indicating how many bytes the identified slot is being increased or decreased; and 3) a 2-byte ds0_channels, which as in the assignment message is the number of leading bytes per upstream burst payload representing DS0 channels, one DS0 channel being allocated per payload byte. In response to a modification message, the targeted ONU (identified by an ONU identification parameter) changes its assigned slot size (i.e., its burst_payload) by the change_size parameter. Every other ONU, which also receives the broadcast message, compares its current start_of_slot boundary to the start_of_change parameter contained in every modification message (targeted to a different ONU). If it has a larger start_of_slot boundary than the start-of-change parameter, it modifies its start-of-slot location by the amount specified by the change_size parameter. Otherwise the modification message is ignored. Therefore, as noted, the modification message not only changes the length of the targeted slot, it also appropriately moves all slots that are located after that targeted slot in the frame. The modification messages are the primary mechanism for reallocating upstream bandwidth as part of the bandwidth management process.

For an idle message, only the message type and the CRC are used, the remaining seven bytes being unused.

An ONU that becomes idle can either have its upstream slot removed, making that bandwidth available for active ONUs, or it can maintain its slot at a minimum length of three bytes (the burst header, with no payload). The former disadvantageously results in a continually changing list of upstream slot assignments and also requires a mechanism for reactivating idle ONUs. The latter minimizes these problems and imposes a maximum impact of only 93 bytes (31×3) should 31 of 32 possible ONU sites enter the idle state.

When the first ONU is installed in the system, it is assigned an ONU identification parameter (ONU id) having a zero address as part of the ranging procedure, and is assigned, as previously noted, the entire 2430 byte frame. As each additional ONU is added to the system, it is assigned the next available ONU id, and the upstream bandwidth is reallocated, as previously described, using one or more modification messages followed by an assignment message.

An ONU that is assigned a zero burst_payload_size (burst size of three bytes), and is in an idle state suspends all upstream transmission including the header within the 3-byte burst. This is expected (by the OLC) since it assigned the idle condition. An ONU awakened from the idle state requests bandwidth by transmitting the header bytes in its assigned 3-byte slot. The OLC responds by transmitting upstream bandwidth management messages downstream to increase that ONU's assigned burst_payload_size.

Figure 3:
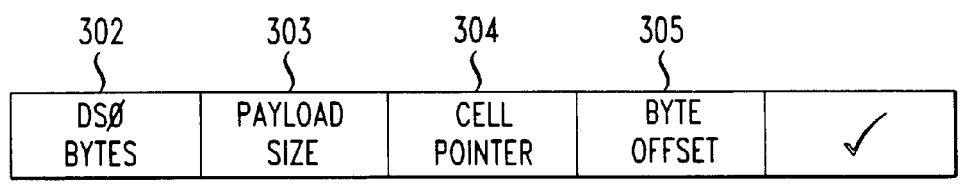
FIG. 3 shows the fields within a word in a slot assignment memory located at the network end, which stores for each ONU the format of the transmitted upstream burst, including its payload size and the number of bytes associated with voice circuits in that payload.

In order to properly interpret received upstream data, the OLC stores an upstream slot map. The upstream slot map identifies the sequence of time slots which make up a frame, each time slot containing a single transmission burst from one of the ONUs. This map is implemented as a list of up to 32 slot entries, which are stored in an upstream slot map memory, wherein each entry corresponds to each of the connected ONUs. The slot entry associated with each ONU identification parameter (0–31) defines the size and composition of the burst, containing both the payload size of the contained burst as well as the number of leading DS0 bytes within that payload. FIG. 3 illustrates the contents of each word in the slot assignment memory. Each slot entry 301 defines the size and composition of the burst associated with ONU identification parameter. The information thus includes a DS0 bytes field 302, which defines the number of DS0 bytes within the payload for that burst, and a payload size field 303, which defines the total payload size of the burst. In addition, each entry contains information used for storing received ATM data from that ONU. This additional information consists of a cell pointer 304 to a cell buffer indicating where upstream ATM data should be written, and a byte offset 305 indicating where the next received byte should be written. Whereas the DS0 byte(s) that arrive in each burst can be directly routed to DS1 interface circuitry, the ATM data received within a burst needs to be stored since the 53 bytes that make up a single ATM cell may not be contained within a single burst and, in fact, could be contained in as many a 53 bursts across 53 frames if only one byte of payload is allocated to the associated ONU for transporting ATM data.

Figure 4:
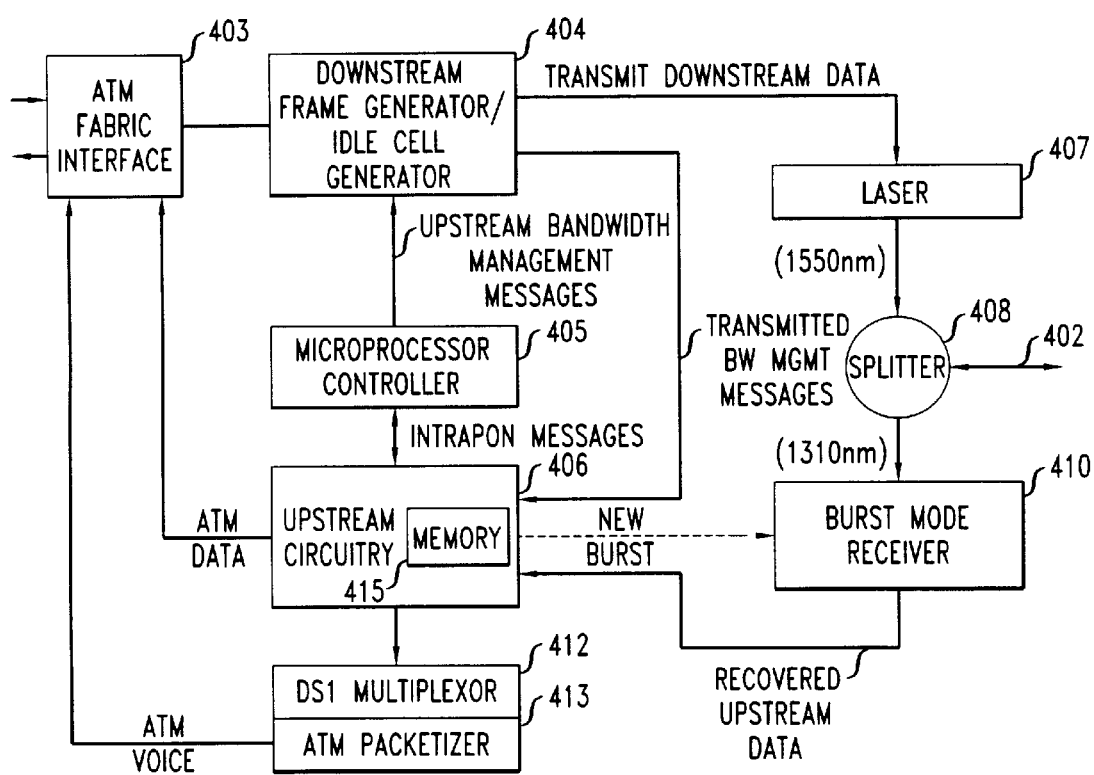
FIG. 4 is a block diagram of Optical Line Card (OLC) at the network end of the system of FIG. 1.

FIG. 4 is a block diagram of a single OLC 401 representing one of the OLCs 203 in FIG. 2. OLC 401 contains those components necessary to support a single PSPON 402 for providing service to up to 32 ONUs. An ATM fabric interface 403 is an interface to the ATM switching fabric of the OLT (201 in FIG. 2), providing ATM cells to and receiving ATM cells from that fabric. These ATM cells may be, for example, cells received through a SONET interface 202 from ATM network 114 transmitted by video server 117 or Internet server 116. These ATM cells could also contain two DS1 frames of 24 bytes each of digitized voice received through a DS1 interface 204 from PSTN 115. In the downstream direction, the ATM cells received by ATM fabric interface 403 are inputted to downstream frame generator/idle cell generator (DFG/ICG) 404. DFG/ICG 404, at a rate of 8000 frames/sec, generates a framing structure of 2430 bytes consisting of 2427 payload bytes and 3 framing bytes. Also inputted to DFG/ICG 404 are upstream bandwidth management messages (e.g., the PLOAM cells previously described), which are outputted by microprocessor controller 405. These upstream bandwidth management messages, encapsulated in ATM cells and the ATM data cells received from ATM fabric interface 403 are written into a buffer (not shown) and then outputted in the 2427 payload bytes of an output frame. As previously noted, an ATM cell may overlap frames. The upstream bandwidth management messages include the previously described assignment messages and/or modification messages. Due to their relative importance, these PLOAM cells are quickly outputted to the output ATM cell stream from the buffer by DFG/ICG 404 in likely priority over ATM data from interface 403. The microprocessor also periodically generates control messages, which are used to check the health of each of the ONUs that are connected to the PSPON fiber 402. These control messages are also transmitted downstream over an ATM virtual control channel.

The upstream bandwidth management messages (PLOAM cells) are generated by microprocessor controller 405 in response to an intraPON message generated by upstream circuitry 406. This intraPON message is generated in response to an upstream message transmitted on an ATM control virtual channel (VC) by one of the connected ONUs. Such an upstream message may be generated either unilaterally by the ONU or may be generated in response to a downstream query transmitted over the control VC to that ONU. Thus, for example, if a "sleeping" ONU suddenly wakes up after having not transmitted anything upstream for a period of time, once a non-zero burst payload is assigned, information is sent upstream on that VC to upstream circuitry 406 which in turn generates an intraPON message that is inputted to microprocessor controller 405 and which requests appropriate bandwidth with which to transmit upstream. Microprocessor controller 405 then generates the necessary modification and assignment messages which allocate payload bytes to that ONU in subsequent upstream frames. Similarly, if the demand for bandwidth suddenly increases at an ONU, such as when a connected PC has a large amount of data to transmit, the ONU sends a message on the control channel, which generates an intraPON message to microprocessor controller 405. This in turn causes upstream bandwidth management messages to be generated and sent downstream that result in an increase of the size of the payload allocated to that ONU.

When the buffer within DFG/ICG 404 has no ATM data cells, ATM voice cells, upstream bandwidth management messages, or periodic control messages to transmit, DFG/ICG generates idle cells, which are recognized as such by receiving ONUs. Regardless of the content of its payload, the frame-formatted output of DFG/ICG 404 is input to a laser 407, which converts the electrical signal to an optical signal at a wavelength of 1550 nm. The optical signal is input to optical splitter 408 for downstream transmission over PSPON fiber 402.

The upstream bandwidth management messages outputted by DFG/ICG 404 onto the downstream data stream are also inputted to upstream circuitry 406. This enables DFG/ICG 404 to properly detect the frame structure of subsequent upstream frames that will have changed due to the reception at each ONU of the downstream transmitted upstream bandwidth management messages. Thus, the upstream bandwidth management messages that are inputted to upstream circuitry 406 are used to modify the upstream slot memory 415 within upstream circuitry 406. Specifically the entry that corresponds to the ONU whose slot size has changed needs to be updated. Note that the slot assignment memory does not contain start-of-burst information. Therefore, only the changed burst needs to be changed.

The change to the entries within slot memory 414 are not effected immediately since the upstream bandwidth management messages that have been transmitted downstream have a transmission delay and electronic response within the ONU. Since this total delay is deterministic, a corresponding delay is implemented within upstream circuitry 406 so that the expected response to the upstream management messages is synchronized to the changed locations of the upstream bursts. As was previously discussed, as a result of the ranging procedure the total delay is two frames. A third frame of delay is inserted within the ONU to compensate for any required delays or delays in the electronic circuitry. The upstream circuitry 406 thus does not expect a response to the upstream bandwidth management messages until three frames after their transmission. Therefore, the slot memory is not updated until three frames after transmission of these messages.

In the upstream direction, a stream of variable length bursts from the ONUs are sequentially received by OLC 401 via PSPON fiber 402 at a 1310 nm wavelength, one burst per ONU. In the described embodiment, as described, each burst consists of a three byte header and a variable number of payload bytes. As previously noted, every 2430 bytes, the sequence of bursts is repeated. These upstream bursts are inputted to optical splitter 408, which passes the optical signal to burst mode receiver (BMR) 410. Since upstream circuitry 406 "knows" the sizes and locations where each burst starts and ends within the frame structure, BMR 410, in response to a "new burst" signal from upstream circuitry 406 is ready to lock onto the next burst as a previous burst ends, and convert the received optical signal to an electrical signal. The output of BMR 410 is therefore the upstream data transmitted by each ONU.

As previously noted, each burst from an ONU includes one byte for each active voice circuit followed by ATM data originating, for example, from a video terminal and/or data terminal such as a PC. Each burst may contain anywhere from less than one ATM cell to several ATM cells, depending upon the burst length. Further, the burst may contain the ATM messages being transmitted upstream in response to downstream transmitted queries, or the ATM messages being transmitted to request a change in bandwidth allocation. The upstream circuitry 406 upon receiving each burst and in response to the associated ONU's entry in the upstream slot memory accumulates those bytes associated with ATM data to form complete cells, which are then passed to ATM fabric interface 403. These ATM cells are then directed through the ATM switching fabric 201 to the appropriate SONET interface 202 for transmission to the cell's addressed destination. As noted, the DS0 byte field 302 in each entry in the upstream slot memory indicates the number of DS0 voice circuit bytes that precede the ATM data within the payload of each burst. The up to 48 DS0 bytes associated with the voice circuits in each frame from all the ONUs connected to PSPON fiber 402 are outputted to a DS1 multiplexor 412 and packaged together in an ATM cell by ATM packetizer 413 as two DS1 frames for output through ATM fabric interface 403 onto the PSTN. If the 32 ONUs have a total of more than 48 but less than or equal to 96 active voice circuits, then these additional voice circuits are packaged together in another ATM cell for output through ATM fabric interface 403 onto the PSTN.

If ATM cells received by DS1 interface 204 of FIG. 2 contain less than 48 active DS0 channels, received ATM cells from multiple OLCs are typically combined producing more efficiently utilized DS1 PSTN frames.

Figure 5:
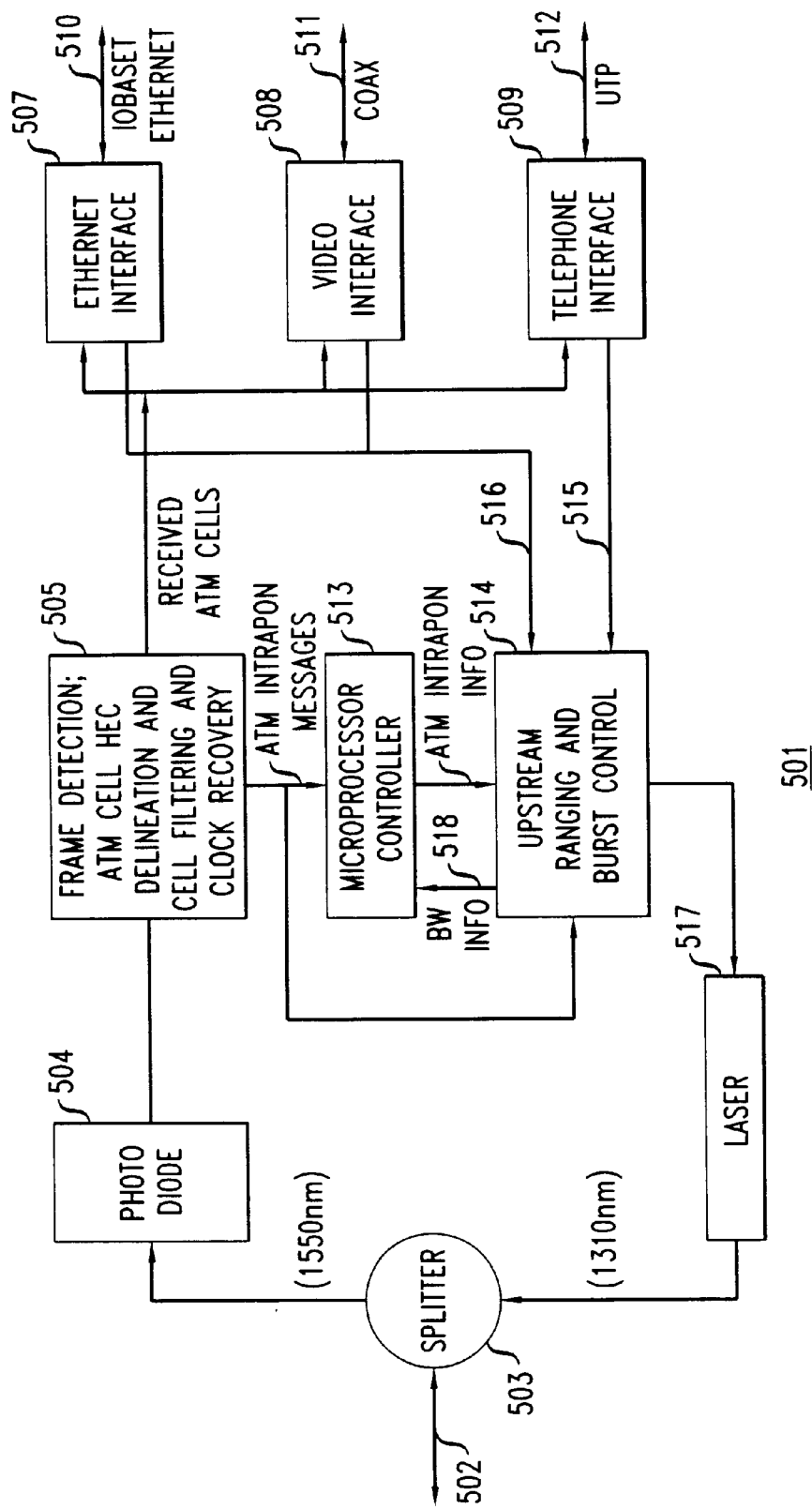
FIG. 5 is a block diagram of the ONU terminal at the outside plant in the system of FIG. 1 that interconnects the PSPON fiber with each end user's terminal equipment.

FIG. 5 is a block diagram of an ONU 501, which is connected at a business/residence premises. The ONU is connected to a PSPON fiber 502, which is connected to a passive splitter (not shown), which splits the downstream optical signal transmitted by the OLC in up to 32 equal signals. PSPON fiber 502 is connected to an optical splitter 503 which separates the downstream and upstream transmissions. The downstream signal, at 1550 nm is inputted to a photodiode 504, which acts as an optical/electrical interface, converting the downstream optical signal to an electrical signal. The electrically converted downstream signal is inputted to a frame-detection/ATM-cell-HEC-delineation/cell-filtering/clock-recovery circuit 505. Circuit 505 detects the downstream data stream and recovers clock from a clock and data recovery circuit (CDR) (not separately shown). The downstream frame is then detected by looking for the framing pattern. Once framing has been established, the framing bytes are "thrown away", leaving only ATM cells. The cell boundaries are then determined using HEC delineation. Circuit 505 then determines from the cell headers which received cells are being broadcast to all connected end users or are directed to that particular ONU. Only that subset of all received ATM cells that have been broadcast or are directed to the ONU are outputted onto a receive ATM bus 506, which is connected to Ethernet interface 507, video interface 508, and telephone interface 509. Each interface then determines from those cells, which cells it should receive. Ethernet interface 507 passes only those cells that are directed to a connected data terminal (e.g., a PC) to its 10baseT Ethernet connection 510. Video interface 508, which likely includes an MPEG decoder and NTSC encoder (not shown) generates from the received video cells a conventional television signal that is outputted onto coax connection 511 for transmission to a connected analog television set. For upstream video communications from, for example, a video camera or other video source, video interface 508 would also include an MPEG encoder for coding the video signal into a digital format. Since downstream voice transmission is via an ATM VC containing 48 S0 bytes, telephone interface 509 passes onto UTP 512 the single byte per received frame associated with its active telephone connection. If an analog telephone rather than a digital telephone is connected to UTP 512, then telephone interface 509 includes a digital/analog converter for downstream voice communications and an analog/digital converter for upstream voice communications. If more than one telephonic connection is associated with an ONU, then a separate telephone interface would be connected to each telephone station set via a separate UTP.

A received downstream cell may not be an ATM cell that contains information directed to an end user terminal but rather an intraPON cell containing upstream slot management messages, or other control information. Such a cell is directed to the ONU microprocessor controller 513 and upstream ranging and burst controller 514 by circuit 505. In response to a query transmitted downstream by the OLC to the ONU on the control channel, such as a status or health check, microprocessor controller 513 responds appropriately by generating an ATM intraPON message that is outputted to upstream ranging and burst (URB) controller 514 for transmission upstream to the OLC in an ATM control channel.

URB controller 514 determines exactly when the ONU should transmit its upstream burst and how many bytes long it should be. It also knows how many bytes within a burst's payload are for transmitting DS0 bytes. In ONU 501 of FIG. 5, only a single telephone interface 509 is shown. Thus, there will be either zero or one DS0 byte sent over connection 515 to URB controller 514 each frame depending upon whether or not there is an active telephonic connection ongoing. The outputs from Ethernet interface 507 and video interface 508, however, consists of ATM cells, which are input to URB controller 514 via bus 516. URB controller 514, formulates the upstream burst consisting of the three header bytes, and a payload consisting of the DS0 byte, if present, which is concatenated with ATM intraPON cells from microprocessor controller 513 and data and/or video ATM cells received over bus 516 from Ethernet interface 507 and video interface 508. If neither the data terminal connected to Ethernet interface 507 nor a video terminal (e.g., camera) connected to video interface 508 have any ATM cells to transmit within a burst, then URB controller 514 inserts idle cells into the payload of the burst, which are recognized as such by the OLC when it receives that burst.

The time within a frame when URB controller 514 outputs its burst is function of both where relative to the start of the upstream frame its assigned time slot is and the ranging delay that is imposed on the output of each ONU connected to the common splitter. As previously noted, this enables the bursts from the plural ONUs to be properly synchronized with one another as they are received at the OLC. The burst outputted by URB controller 514 is converted to an optical signal by a laser 517 operating at a 1310 nm wavelength. The 1310 nm optical signal is then inputted to optical splitter 503 for upstream transmission over fiber 502 back to the splitter (not shown).

As previously noted, circuit 505 outputs the downstream-transmitted upstream bandwidth management messages to both microprocessor 513 and controller 514. Thus, when a modification message is received, URB controller 514 modifies the timing of its slot and the number of bytes in the slot in accordance with the received messages. If a modification message changes the length of the burst, then URB controller 514 changes the number of bytes in its payload accordingly. If a received modification message changes the length of a burst outputted by another ONU which is located within the frame before the burst location of this ONU, then the length of the burst outputted by this ONU will not change, but its location within the frame is changed due to the change of the length of a burst from a preceding ONU.

An ONU that is "sleeping", requiring no bandwidth, may suddenly "wake up" and require bandwidth to transmit upstream. URB controller 514 then sends the 3-byte burst header upstream to the OLC, which responds by transmitting a modification message downstream that assigns payload bytes to that ONU's slot. URB controller 514, in response to that modification message, modifies the length of the burst accordingly. If during operation additional bandwidth is needed, URB controller 514 outputs this bandwidth (BW) information via connection 518 to microprocessor controller 513. Microprocessor controller 514, in response to that BW information, generates an ATM control message that is inputted to URB controller 514 and is transmitted upstream to the OLC. The OLC then generates a modification message, which is transmitted downstream back to the ONU to increase the burst length. Similarly, during operation there may be an under-use of the bandwidth assigned to the ONU, which is recognized by URB controller 514 from a repeated transmission of bursts containing a plurality of idle cells. That BW information is inputted to microprocessor controller 513, which generates an appropriate ATM control message, which is inputted to URB controller 514 and transmitted downstream to the OLC. The OLC, in response thereto, generates a modification message that decreases the byte length of the burst, enabling those now available bytes to be assigned to other ONUs.

The above-described embodiment has assumed downstream and upstream transmission over a PSPON fiber. The present invention could also be applied to any type of fiber using passive or active power-splitting to any number of endpoints distant from a network end. Further, the present invention could be applied to any type of TDM/TDMA transmission system at any frequency or wavelength, be it over wire, over air, over microwave, or any other transmission medium known today or later invented. Further, the term "end user terminal" used herein is intended to means a terminal of any type which receives a downstream signal from a network end, and transmits an upstream signal back to the network end. Even further, the above-described embodiment has assumed transmission of ATM cells. Other types of formatted data could equally be used such as IP packets.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language that have been recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention.

The functions of the various elements shown in the FIGS., including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means which can provide those functionalities as equivalent to those shown herein.

The invention claimed is:

1. In a TDM/TDMA communications system in which a signal is transmitted downstream on a first channel over a communications medium from a network end to a plurality of network units connected to end user terminals, and the plurality of network units transmit bursts in sequential fixed-length frames upstream over the communications medium to the network end, a method comprising the steps of:

receiving an indication of the bandwidth required by the end terminals connected to the plurality of network units;

transmitting information downstream for allocating bandwidth within each frame to the network units in accordance with the received bandwidth requirements of the end terminals connected to the network units; and receiving an upstream frame that is formed so that it contains no more than one burst from each network unit, the length of a payload in a burst from a network unit being determined in accordance with the bandwidth requirements of the end user terminals connected to that network unit and the other network units in the system and being adjustable anywhere from zero bytes to the total number of payload bytes available in the frame, the burst from each network unit in the upstream frame containing digital information from the transmitting end user terminals that are connected to that network unit.

2. The method of claim 1 wherein within each received frame each received burst from a network unit is received immediately after it has finished receiving an earlier transmitted burst in the frame from another network unit.

3. The method of claim 1 further comprising the steps of:
receiving an indication of a change in the bandwidth requirements at an identified network unit;
transmitting information downstream to modify the length of the payload of the burst transmitted by the identified network unit in accordance with the changed bandwidth requirements of that network unit, and
receiving from the identified network unit in a subsequent frame a burst having the modified payload length.

4. The method of claim 3 further comprising the step of:
transmitting information downstream for changing a byte location within the subsequent frame of each burst that follows the burst from that network unit whose payload length is modified.

5. The method of claim 1 wherein the payload in a burst received from a network unit to which a predetermined number of active telephonic devices are connected includes a fixed number of bytes for each of said predetermined number of devices, each of said fixed number of bytes being used for carrying upstream a digitized telephone signal originating from one of said telephonic devices.

6. In a TDM/TDMA communications system in which a signal is transmitted downstream on a first channel over a communications medium from a network end to a plurality of network units connected to end user terminals, and the plurality of network units transmit bursts in sequential fixed-length frames upstream on a second channel over the communications medium to the network end, a method at a network unit comprising the steps of:
sending to the network end an indication of the bandwidth requirements of the end user terminals connected to this network unit;
receiving an allocation of bandwidth within an upstream frame to this network unit in accordance with the bandwidth requirements of the end user terminals connected to this network unit and the other network units in the system;
transmitting at most one burst in the upstream frame having a length determined by the received allocated bandwidth and which is adjustable anywhere from zero bytes up to the maximum number of payload bytes available in the upstream frame, the burst containing digital information from the transmitting end user terminals that are connected to this network unit.

7. The method of claim 6 wherein the one burst transmitted in the upstream frame is transmitted so that the network end receives this burst immediately after it has finished receiving an earlier transmitted burst in the frame from another network unit in the system.

8. The method of claim 6 further comprising the steps of:
receiving an indication to modify the length of the payload of the burst transmitted by this network unit that is sent by the network end in response to a changed bandwidth requirement of one or more end user terminals connected to one or more of the plurality of network units in the system; and
modifying the length of the payload of the burst transmitted by this network unit in a subsequent frame in accordance with the received indication.

9. The method of claim 6 further comprising the step of:
changing a byte location within a subsequent frame that the one burst is transmitted if an indication is received from the network end to modify the length of the payload of another network unit in the system which transmits its burst in the frame before this network unit transmits its one burst.

10. The method of claim 6 wherein a predetermined number of active telephonic devices are connected to this network unit and the payload in the one burst transmitted from this network unit in each frame includes a fixed number of bytes for each of said predetermined number of telephonic devices, each of said fixed number of bytes being used for carrying upstream a digitized telephone signal originating from one of said telephonic devices.

11. In a TDM/TDMA communications system in which a signal is transmitted downstream on a first channel over a communications medium from a network end to a plurality of network units connected to end user terminals, and the plurality of network units transmit bursts in sequential fixed-length frames upstream over the communications medium to the network end, apparatus at the network end comprising:
means for receiving an indication of the bandwidth required by the end terminals connected to the plurality of network units;
means for transmitting information downstream for allocating bandwidth within each frame to the network units in accordance with the received bandwidth requirements of the end terminals connected to the network units; and
means for receiving an upstream frame that is formed so that it contains no more than one burst from each network unit, the length of a payload in a burst from a network unit being determined in accordance with the bandwidth requirements of the end user terminals connected to that network unit and to the other network units in the system and being adjustable on a anywhere from zero bytes to the total number of payload bytes available in the frame, the burst from each network unit in the upstream frame containing digital information from the transmitting end user terminals that are connected to that network unit.

12. The apparatus of claim 11 wherein within each received frame each received burst from a network unit is received immediately after it has finished receiving an earlier transmitted burst in the frame from another network unit.

13. The apparatus of claim 11 further comprising:
means for receiving an indication of a change in the bandwidth requirements at an identified network unit;
means for transmitting information downstream to modify the length of the payload of the burst transmitted by the identified network unit in accordance with the changed bandwidth requirements of the identified network unit, and
means for receiving from the identified network unit in a subsequent frame a burst having the modified payload length.

14. The apparatus of claim 13 further comprising:
means for transmitting information downstream for changing a byte location within the subsequent frame of each burst that follows the burst from that network unit whose payload length is modified.

15. The apparatus of claim 11 wherein the payload in a burst received from a network unit to which is connected a predetermined number of active telephonic devices includes a fixed number of bytes for each of said predetermined number of devices, each of said fixed number of bytes being used for carrying upstream a digitized telephone signal originating from one of said telephonic devices.

16. In a TDM/TDMA communications system in which a signal is transmitted downstream on a first channel over a communications medium from a network end to a plurality of network units connected to end user terminals, and the plurality of network units transmit bursts in sequential fixed-length frames upstream on a second channel over the communications medium to the network end, apparatus at a network unit comprising:

means for sending to the network end an indication of the bandwidth requirements of the end user terminals connected to this network unit means for receiving an allocation of bandwidth within an upstream frame to this network unit in accordance with the bandwidth requirements of the end user terminals connected to this network unit and the other network units in the system; and means for transmitting at most one burst in the upstream frame having a length determined by the received allocated bandwidth and which is adjustable on anywhere from zero bytes up to the maximum number of payload bytes available in the upstream frame, the burst containing digital information from the transmitting end user terminals that are connected to this network unit.

17. The apparatus of claim 16 wherein the transmitting means transmits its one burst at a time within the frame so that it is received at the network end immediately after the network end has finished receiving an earlier transmitted burst in the frame another network unit in the system.

18. The apparatus of claim 16 further comprising:

means for receiving an indication to modify the length of the payload of the burst transmitted by this network unit that is sent by the network end in response to a changed bandwidth requirement of one or more end user terminals connected to one or more of the plurality of network units in the system; and means for modifying the length of the payload of the burst transmitted by this network unit in a subsequent frame in accordance with the received indication.

19. The apparatus of claim 18 wherein the transmitting means transmits a burst upstream in a subsequent frame at an adjusted byte location within the frame to compensate for a modified payload length of a burst from another network unit that transmits its burst in the frame before the burst from this network unit.

20. The apparatus of claim 16 wherein the transmitting means transmits in each frame a burst whose payload includes a fixed number of bytes for each of a predetermined number of active telephonic devices which are connected to this network unit, each of said fixed number of bytes being used for carrying upstream a digitized telephone signal originating from one of said active telephonic devices.

21. In a TDM/TDMA optical communications system in which an optical signal is transmitted downstream at a first wavelength over a fiber from a network end to a plurality of optical network units connected to end user terminals, and the plurality of optical network units transmit bursts in sequential fixed-length frames upstream over the fiber at a second wavelength to the network end, an optical line card at the network end comprising:

a frame generator that generates fixed-length downstream frames containing information transmitted to the plurality of optical network units;

a processor that generates upstream bandwidth management messages which are incorporated by the frame generator in the information transmitted in the downstream frames, the upstream bandwidth management messages providing information to the optical network units for adjusting the lengths of the payloads of the bursts and the byte location of the bursts within the frame transmitted upstream;

upstream circuitry including a storage medium on which is stored burst information used for determining the length of the payload and the timing of each burst within each fixed-length upstream frame, the length of each payload being determined by an allocation of the bandwidth within each frame among each of the transmitting optical network units in accordance with the bandwidth requirements of the active end user terminals connected to each optical network unit, each upstream frame being formed so that it contains no more than one burst from each network unit and the payload in a burst from a network unit being adjustable anywhere from zero bytes to the total number of payload bytes available in the frame, the burst from each network unit containing digital information from the transmitting end user terminals that are connected to that network unit; and a burst receiver which in response to the burst information stored in the storage medium separately detects each burst within each upstream transmitted frame and provides the information transmitted in each burst to the upstream circuitry.

22. The optical line card of claim 21 wherein the upstream circuitry receives information in a burst from an optical network unit representing a request for a modification of the length of the burst payload, the upstream circuitry sending a message to the processor which generates an upstream bandwidth management message to modify that burst payload length, which message is also inputted to the upstream circuitry to modify the stored burst information.

23. The optical line card of claim 22 wherein the upstream bandwidth management message inputted to the upstream circuitry modifies in the storage medium the length of the modified burst payload and a byte location within the frame of the bursts that follow that payload-modified burst.

24. The optical line card of claim 21 wherein the payload in a burst received from an optical network unit to which is connected a predetermined number of active telephonic devices includes a fixed number of bytes for each of said predetermined number of telephonic devices, each of said fixed number of bytes being used for carrying upstream a digitized telephone signal originating from one of said telephonic devices.

* * * * *